(12) United States Patent
Manheimer, III et al.

(10) Patent No.: US 8,100,088 B2
(45) Date of Patent: Jan. 24, 2012

(54) ANIMAL NAIL CLIPPER

(75) Inventors: Ben Manheimer, III, Chesterfield, MO (US); Vaughan Weeks, Racine, WI (US); Ruth Webb, Racine, WI (US)

(73) Assignee: STIM, LLC, Chesterfield, MO (US)

( * ) Notice: Subject to any disclaimer, the term of this patent is extended or adjusted under 35 U.S.C. 154(b) by 13 days.

(21) Appl. No.: 12/590,534

(22) Filed: Nov. 10, 2009

(65) Prior Publication Data
US 2010/0107989 A1 May 6, 2010

Related U.S. Application Data

(63) Continuation-in-part of application No. 11/591,761, filed on Nov. 2, 2006, now abandoned.

(60) Provisional application No. 60/751,054, filed on Dec. 16, 2005.

(51) Int. Cl.
*A01K 13/00* (2006.01)
(52) U.S. Cl. ........................ 119/610; 119/600; 119/601
(58) Field of Classification Search .................. 119/600, 119/601, 610; 30/26, 28, 29; 132/73, 73.5, 132/75.4, 75.5
See application file for complete search history.

(56) References Cited

U.S. PATENT DOCUMENTS

| 2,955,354 | A | | 10/1960 | Laing |
| 3,838,507 | A | | 10/1974 | Clark |
| 3,845,553 | A | | 11/1974 | Fields |
| 4,228,585 | A | | 10/1980 | Nelson |
| 5,195,925 | A | * | 3/1993 | Gorans ........................ 452/166 |
| 5,619,128 | A | | 4/1997 | Heger |
| 6,827,038 | B2 | | 12/2004 | Dunn et al. |
| 7,000,321 | B1 | | 2/2006 | Rodgers |
| 7,124,669 | B1 | * | 10/2006 | Rodgers ........................... 83/13 |
| 7,464,665 | B1 | * | 12/2008 | Rogers et al. ................ 119/600 |
| 7,848,799 | B2 | * | 12/2010 | Herndon ...................... 600/547 |
| 2004/0034283 | A1 | | 2/2004 | Quaid |
| 2005/0132975 | A1 | | 6/2005 | Huggans |
| 2006/0042559 | A1 | | 3/2006 | Kang |

* cited by examiner

*Primary Examiner* — David Parsley
(74) *Attorney, Agent, or Firm* — Paul M. Denk

(57) ABSTRACT

A clipper for clipping nails of an animal such as a dog, or cat, that allows for the clipping of an individual nail at the desired length while preventing injury to the animal, including a clipper portion and a sensing portion which allows the nail to be localized in a desired position relative to the clipping plane of the clipper and the internal structure of the nail, wherein the sensing portion is included within circuitry that includes a signal generation portion, a signal reception portion, and a quick indicator. The animal nail is positioned near the clipper portion and the sensing portion produces a sensible signal confirming the position of the clipping plane upon the nail, particularly the quick of the nail. The user then may adjust the position of the clipper portion such that the clipping plane avoids the quick. The user then actuates the clipper portion and trims the nail.

18 Claims, 9 Drawing Sheets

ANIMAL NAIL CLIPPER

CROSS REFERENCE TO RELATED APPLICATION

This continuation-in-part application claims priority to the regular patent application having Ser. No. 11/591,761 filed on Nov. 2, 2006 now abandoned, which claims priority to the non-provisional application for patent Ser. No. 60/751,054 which was filed on Dec. 16, 2005 and is commonly owned by the same inventors.

BACKGROUND OF THE INVENTION

This invention relates generally to grooming equipment for animals such as pets and more particularly to a nail clipper that confirms the location of the nail's quick to prevent cutting it during nail trimming. This invention also senses the internal structure of the nail prior to clipping and allows accurate positioning of the blade just outside of the quick of the nail for a bleed-free nail clipping.

Animal nails, such as those cats, dogs, other mammals, and birds, contain a blood supply, called the quick, and nerves that can bleed excessively and induce severe sensations of pain if they are accidentally cut during nail trimming. As later shown, FIGS. 1-6 illustrate the anatomy of an animal nail, showing the quick, its relationship to the remainder of the nail, and effective cutting of both.

Various types of nail clippers exist that provide precise hand-controlled trimming of the nails and other instruments provide nail filing, either by hand or power means. Experienced, successful users of nail clippers keep a styptic pencil nearby to stop nail bleeding if it occurs. However, the typical pet owner has tried trimming her pet's nails one time too many and caused pain, bleeding and trauma by cutting through the quick. Most animals, pets, dislike having their nails clipped. Inadvertent cutting into the quick of the nail can injure the animal causing both pain and bleeding, more than likely in pets with dark colored nails. Once this happens, pet owners have grave difficulty in attempting nail grooming again. Generally, most pet owners avoid cutting their pets' nails by deferring that task to a grooming service or their veterinarian. However, those services can be expensive and require transporting the pet to and from the service location.

DESCRIPTION OF THE PRIOR ART

Various animal nail clippers have been shown in the prior art such as U.S. Pat. No. 2,955,354, issued to Laing, and U.S. Pat. No. 3,838,507 issued to Clark, and U.S. Pat. No. 4,228,585, issued to Nelson. One of the deficiencies in prior art clippers is no provision for localizing the quick of the nail prior to clipping the nail thus avoiding the aforementioned injury. The present invention overcomes this deficiency by providing a mechanically actuated nail clipper for an animal, or pet, which allows the user to sense the position of the quick prior to clipping the nail then to clip the nail safely at the desired length.

Further, the U.S. Pat. No. 3,845,553 to Fields showed a claw clipper with a reciprocating cutter. The clipper has a gauge 56 to establish how much nail to remove. The reciprocating cutter, 30, then is rapidly advance to clip the nail using a motorized screw. The cutter includes a spring to return the cutter to a recoiled position for the motorized screw to advance the cutter again, reciprocally. Alas, this patent does not detect the presence of the quick with any sensor.

The published patent application to Kang, No. 2006/0042559 shows a clipper for pet claws with a lever operated cutter. The clipper receives a nail on the side and the nail proceeds between the two blades of the cutter. The cutter has a fixed blade and a rotating blade. Grasping the lever rotates the rotating blade to clip the nail. The application discloses a battery powered motor in the larger handle for grinding a clipped nail. The present invention though has a cutter that receives a nail from the bottom and a cutter with two blades. The blades of the present invention slide along a common line while abutting each other. The present invention lacks a motor or other grinding feature but does have the sensing means and quick indicator which differentiates the present invention from the Kang publication.

The U.S. Pat. No. 7,000,321 to Rodgers discloses an optical source and corresponding sensor for detecting the quick of an animal's nail. This patented device has a mechanical clipper with a sliding blade coupled with an optical source and sensor. The source and sensor are mounted proximate the clipper so an accurate reading of light passing through a nail is ascertained by the sensor prior to usage of the clipper. The present invention though has sensing through electrical charge or capacitance or resistance, a thermocouple, piezoelectric, heat, ultrasound, x-ray radiation, and infrared radiation. Once the quick is detected using the sensor, the present invention activates a quick indicator, preferably LED of single or multiple colors, to avoid startling an animal, to guide the user in operating the present invention.

The allowed patent application to Huggans, published as No. 2005/0132975, shows a hand powered nail and claw clipper. The clipper has a mechanical two blade guillotine type cutter where one blade is advanced along the other blade when the handle is closed. The clipper also has a sensor located in the fixed blade opposite the advancing other blade. The sensor is preferably a high intensity light with a cooperating detector or alternatively an ultrasound detector, a pulse oximeter, a laser, and an infra red thermometer. The present invention shares some features with this allowed application. However, the present invention has at least one LED to inform the operator visually, using single or multiple colors, about proximity to the quick and a detector capable of initializing itself. The detector establishes, or uses a pre-established, baseline on a non-quick substance, such as air, and uses that baseline to later determine the location of the cutting blade relative to the quick. An operator need not look at the position of the cutting blade on a nail but rather at the LED.

The present invention overcomes the limitations of the prior art where the animal nail clipper provides a sensing means coupled to a visual output to guide an operator in positioning the clipper upon an animal's nail for cutting without injuring the quick. The prior art cutters do not provide for guiding the cutter away from the quick but rather provide mere detection of the quick.

SUMMARY OF THE INVENTION

A device for cutting nails of an animal such as a dog, cat, or the like has a first handle, a second handle connected to the first handle, and pivotably moveable relative thereto, a cutting blade connected to the first handle and moveable and connectable to the second handle, a blade guide connected to the first handle, the blade being mounted to slide upon the blade guide. The device also has a sensing means attached to either the first handle, the second handle, the blades, or any combination of these parts.

The essence of this invention is to provide a quick sensing and locating, claw clipper for trimming animal claws and nails. The purpose of the invention is to provide a means and method for locating the quick of the claw, choosing the appropriate point for trimming said claw, and performing the trimming operation.

This is accomplished by means of an electrical sensor, which is attached to a mechanical device for clipping the nail. The preferred sensor is a single plate of a capacitor, which returns a different frequency response when positioned near air, nail, or nail overlaying quick. Thus, the internal structures of the nail, in particular the blood or living tissue of the quick, or the blood flow, can be localized in order to verify that the cut will be made in a safe place. Alternative sensors for detecting and localizing blood flow include electrical resistance, Doppler ultrasound, commonly used for blood flow detection in humans, or laser imaging.

The invention comprises a clipper means and a sensor means. The clipper means is any of the variety of shearing or grinding processes accomplished within a hand-held device appropriate for selectively removing portions of the animal claws. The sensor means is any of a variety of sensors, including, but not limited, to the following:

1) Transmitter/receiver sensors in which a sensible signal is transmitted though the claw and received on the other side of the claw by an appropriate means. Attenuation, phase change, capacitance change, conductivity, or any other change in the signal, attributable to the presence of the quick in the transmission path which differentiates transmission through claw and quick, is used to identify and localize the quick, thus guiding later trimming of the claw without injury to the quick. Such sensible signals include: infrared light, x-ray radiation, visible light, heat, sound, electricity, electrical charge, and electrical fields.

2) Receiver sensors in which a naturally occurring characteristic of the internal structure of the nail is sensed and interpreted to localize the quick, guiding, further trimming of the claw without injury to it. Such receivable signals include: body heat, blood flow sounds, transmitted ambient visible light, and reflected ambient visible light.

3) Receiver-less sensors impose a signal into or onto the claw and the user relies on their own senses to receive and interpret the resulting information to locate the quick for later trimming of the claw without injury to it. Such interpreted information includes: visible light, vibration, and heat.

In the preferred embodiment, the clipper means is a hand-held and hand-powered shearing device similar to existing claw clippers. The sensor means is of the transmitter/receiver category using capacitance change caused by the presence of dielectric and conductive materials in the nail. The sensor means is mechanically joined to the clipper means such that a constant and known geometry is maintained between the sensor means and the location where the cut will occur when the clipper means is actuated.

The method of using the preferred embodiment of the invention proceeds as follows: the user switches the sensor circuit on. The user then positions the clipper means near the claw and receives an indication in the form of a pattern of colored lights that indicates the structure adjacent to the sensor means. The user then moves the clipper sensor assembly in a proximal direction along the nail until the light pattern indicates that the sensor detects the presence of quick in the cutting zone. The user then moves the clipper sensor assembly distally along the nail until the light pattern indicates the sensor detects only nail. Using the light pattern, the user adjusts the position of the clipper means to the desired trimming location while avoiding the quick. The clipper means is then activated and the cut is made.

In the preferred embodiment the sensor means is a conductive plate, which forms a single plate of a capacitor. Earth ground effectively provides the opposing plate and forms a complete capacitor. The capacitance of the capacitor is affected by the electrical characteristics of material interposed between the single plate and the earth ground. The capacitor is included in a circuit such that changes in the instantaneous capacitance of the capacitor cause a change in the oscillatory frequency of the circuit. The oscillatory frequency is interpreted by a digital processor whose programming differentiates between frequencies arising from interposing air, nail, or nail with underlying quick. The programming causes an appropriate pattern of light emitting diodes (LEDs) to switch on or off communicating the type of material being sensed to the user.

In the preferred embodiment three LEDs are used: green, yellow and red. If the red LED is lit, it indicates that quick is present near the sensor and by inference the clipping means is positioned so that it would cut through quick. If the green LED is lit, it indicates that only nail material is present near the sensor and the clipper means may safely cut. If the yellow LED is lit, the clipping means is in the transition zone between the quick and the nail, thus the user should adjust the position of the clipper. In an alternate embodiment, other light patterns can be used to communicate to the user, including an alphanumeric display, a bar type display, and a liquid crystal display among other things.

Other light patterns, such as no LEDs lit or all LEDs, blinking indicate operational situations, such as low battery power or no material other than air in the vicinity of the sensor.

Other possible variations upon the concept and method of this particular invention may include: 1) the clipper means is powered by batteries or external power electromechanically coupled to the shearing blades, 2) the sensor means is powered externally, 3) the sensor means utilizes conductive portions of the clipper means as a capacitor plate, 4) the sensor is separate from the clipping means and is used independently to localize safe cutting areas, 5) the clipper means uses a burr or grinder to remove claw material, 6) the sensor means is electrically conductive and the clipper means is a grinder that automatically progresses forward along the claw until changes in conductivity indicate that the grinding is close to the quick, and 7) the clipper means uses a simple processor that automatically selects and positions the clipper means for optimum trimming of the claw.

In one embodiment the blades or cutters mounted to the blades are electrically isolated from each other and form the contact points for the sensing means. The sensing means imposes a voltage potential between the blades. Upon contact with the nail material the electrical potential produces a current flow through the nail material. The current flow is then detected and interpreted as either current, voltage drop, or resistance by existing electrical measurement means. The measurement means is then sensibly displayed as visual output by LED or audible output by beeper, tweeter, or horn.

In another embodiment, at least one of the blades is comprised of metallurgical dissimilar materials forming a thermocouple. The thermocouple becomes a sensing means. Upon contact with the nail material the thermocouple produces an electrical current as a function of the temperature of the underlying nail. The current flow is then detected and interpreted as either current, voltage drop, or resistance by existing electrical measurement means. The measurement means is then sensibly displayed as visual output by LED or audible output by beeper or horn.

In another embodiment, the first blade is in mechanical contact with a first piezo-electric device and the second blade is in mechanical contact with a second piezo-electric device, and the first and second piezo-electric devices are mutually sonically isolated. Upon contact with nail material the first piezo-electric device is actuated by an electrical input signal producing a mechanical vibration. The mechanical vibration is communicated through the first blade through the nail material and through the second blade to the second peizo-electric device. The second peizo-electric device responds to the mechanical vibration by producing an electrical output signal which is then communicated to an interpretation circuit. The time interval between the initiation of the electrical input signal and the electrical output signal can be interpreted as the speed of sound through all of the material. Attenuation between the electrical input signal and the electrical output signal can be interpreted as the sonic damping of the nail material. The interpretation of one or both of the speed of sound and the attenuation comprise a measurement means. The measurement means is then sensibly displayed as visual output by LED or audible output by beeper or horn.

In another embodiment the first blade is in thermal contact with a heating means and the second blade is in mechanical contact with a thermocouple device, the first and second blades being mutually thermally isolated. Upon contact with nail material the heating means is actuated by an electrical input signal producing a heat. The heat is communicated through the first blade through the nail material and through the second blade to the thermocouple device. The thermocouple device responds to the heat by producing an electrical output signal. The electrical output signal is then communicated to an interpretation circuit. The time interval between the initiation of the electrical input signal and the electrical output signal can be interpreted as the thermal conductivity of the nail material. The interpretation of the thermal conductivity comprises a measurement means. The measurement means is then sensibly displayed as visual output by LED or audible output by beeper or horn.

In another embodiment the first handle serves as the mounting point for a visible or invisible radiation source. The second handle serves as the mounting point for a radiation detector appropriate to receive radiation from the radiation source and return an electrical signal in response to the radiation. Upon contact with nail material the radiation source is actuated by an electrical input signal. The radiation is communicated through the nail material and is received by the radiation detector. The radiation detector responds to the radiation by producing an electrical output signal. The electrical output signal is then communicated to an interpretation circuit. The attenuation of the electrical output signal when compared with open air attenuation can be interpreted as the opacity of the nail material. The interpretation of the opacity comprises a measurement means. The measurement means is then sensibly displayed as visual output by LED or audible output by beeper or horn. In all of the preceding embodiments the sensing means is considered to be predictably located with respect to the clipping plane of the blades, thereby allowing the user to use the output, visibly or audibly, as a cue to correctly position the clipping plane.

In another embodiment the first handle serves as the mounting point for a visible light source. The light source having sufficient luminosity to allow visualization of the interior structure of the nail material and avoidance of the quick. A sensitive light detecting receiver may be incorporated to allow detection of extremely low levels of transmitted light. An extremely fast electronic gate may also be used to select only those first few photons which reach the receiver as these photons went through a nail on the straightest path.

It is the principal object of this current invention to provide an animal nail trimming device which is capable of indicating the location of the nail quick, and therefore the blood supply and nerves in the nail.

It is an object of this invention to provide an improved nail clipper for an animal, such as a dog or cat, that provides safety while clipping the animal's nails to prevent injury or harm to the animal.

It is an object of this invention to provide an improved nail clipper having a price acceptable to the consuming public where the nail clipper has a capacitor sensor powered by batteries or direct current.

It is an object of this invention to provide an improved nail clipper having a compact capacitor plate sensor and related circuitry that may be added to existing nail cutting devices.

It is a still further object of this invention to provide an improved nail clipper to provide a completely disposable unit is also feasible.

In accordance with these and other objects, which will be apparent hereinafter, the instant invention will now be described with particular reference to the accompanying drawings.

Other variations and modifications to the subject matter of this invention may be considered to those skilled in the art upon review of the invention as described herein. The ideas presented are not intended to limit the scope or application of the device, or its method of usage. Other objects, purposes, methods of usage, and variations may be considered by those skilled in the art.

DESCRIPTION OF THE PREFERRED EMBODIMENT

Figure 1:
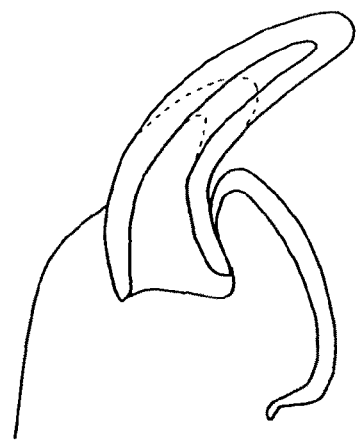
FIG. 1 shows a schematic view of a nail upon the paw of a pet, such as a dog or cat.
Figure 2:
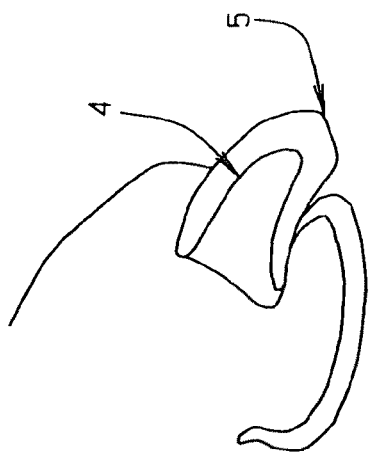
FIG. 2 shows the exposed nail being gauged for cutting.
Figure 3:
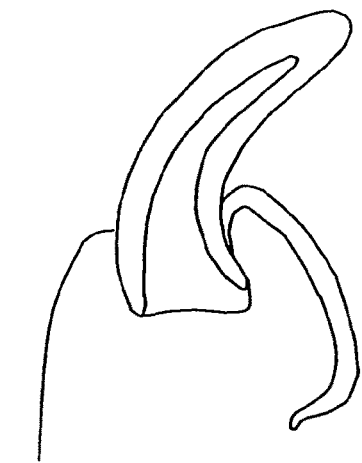
FIG. 3 shows the nail, over a period of time, clipped to retract the blood supply.
Figure 4:
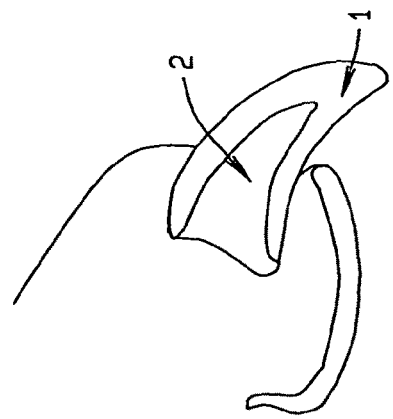
FIG. 4 indicates how the nail gets shorter through repeat cuttings and the blood flow recedes.
Figure 5:
FIG. 5 indicates how the trimming of the nail with repeated short cuttings can prevent bleeding.
Figure 6:
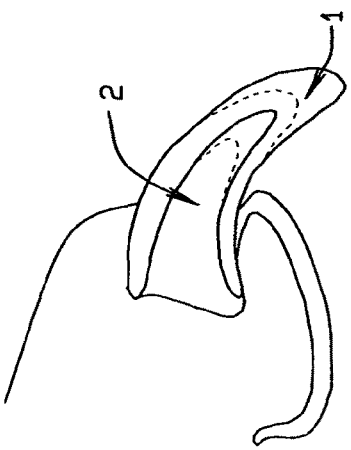
FIG. 6 shows a properly trimmed pet nail.

Referring to the drawings, and in particular FIGS. 1-6, a pet nail, projecting from the paw of the animal, shows what is considered, the dead segment of a nail at 1, but yet having an internal portion of the blood supply at 2, the quick, inherently provided therein. The concept of this invention, and the use of a clipper with a sensor, is to provide for a trained trimming of the nail, at the very tip, initially in FIG. 2, until such time as the blood supply within the nail gradually recedes, as a result of short trimmings, until such time as the blood supply has withdrawn significantly towards the paw as can be seen in FIG. 6, at 4, so that a substantial portion of the nail may be trimmed, as at 5, subsequently. As the figures indicate, in FIG. 1, the blood supply, generally identified as "quick" 2, is shown in a short nail 1. As the nail grows, as seen in FIG. 2, the blood supply gets somewhat longer as the nail grows. At this stage, if a cut is made at the tip of the blood supply, bleeding will occur, and the nail will still remain too long as in FIG. 2. If one trims at a greater distance, the blood supply is not encountered, but it will naturally begin to recede, and get shorter, as explained. As noted in FIG. 3, if the user clips or files a little off the long nail periodically, the blood supply will continue to recede within the nail, and be contracted towards the paw. As noted in FIG. 4, as the nail eventually gets shorter, through repeated trimmings, the blood supply also recedes, as can be noted. In FIG. 5, only when the nail is kept short, can it be trimmed without bleeding. If the same cut had been made on the long nail as shown in FIG. 2, it would have caused bleeding and pain to the animal. But, with proper sequential trimming daily, over a period of time, such as for a few days or a week or two, the blood supply continues to recede, only the dead portion of the nail is trimmed, and trimming for the animal is not a painful experience, when the blood supply has receded and is not encountered in trimming.

Figure 7:
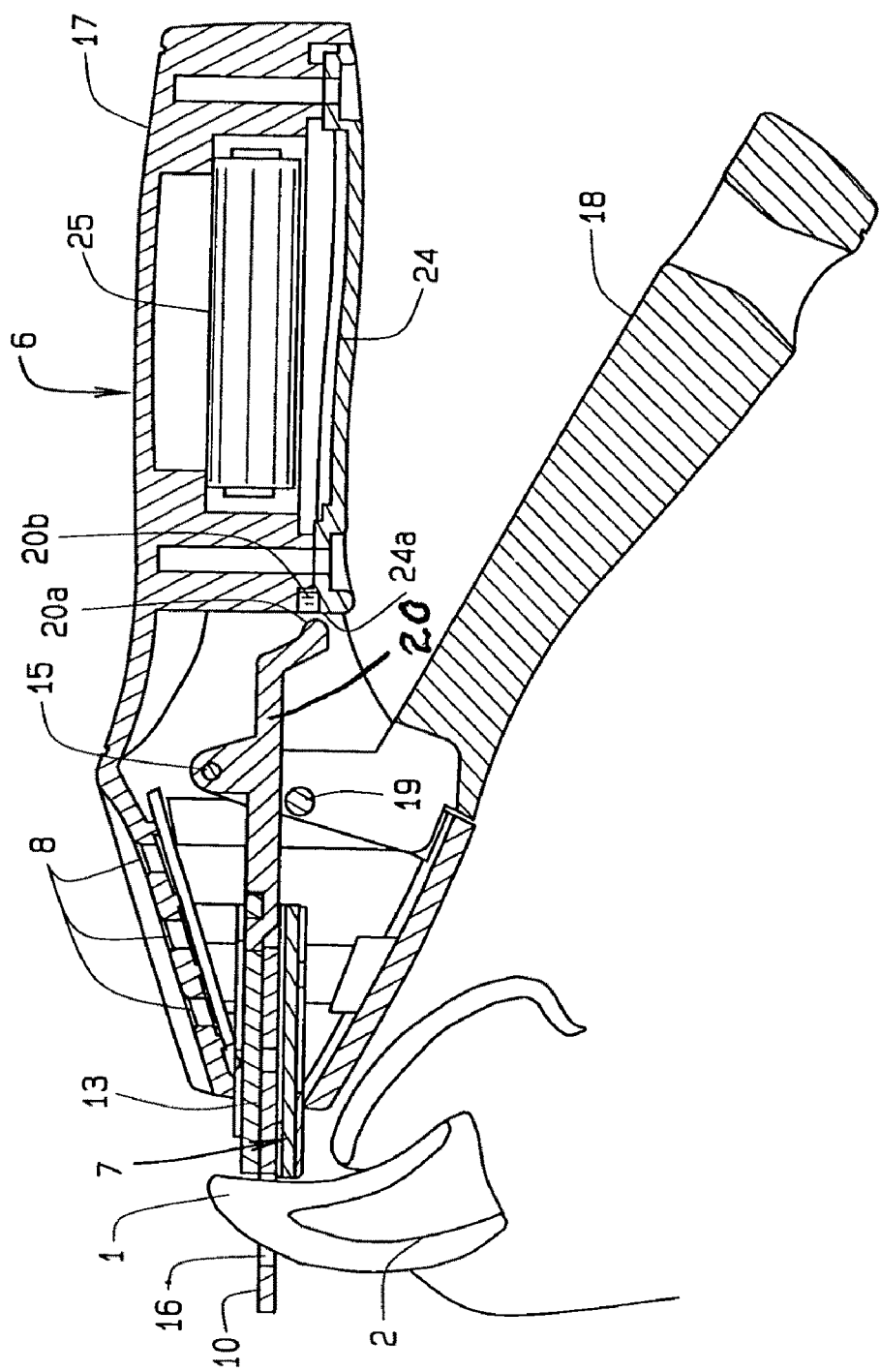
FIG. 7 shows the nail in the process of clipping by a trimmer, incorporating a sensor means, for the combination to disclose the internal blood supply in the nail, and the location where a trim can be made.

As can be seen in FIG. 7, the paw with nail 1 is disclosed. A trimmer, as at 6, is provided. Structured into the trimmer, is a circuit board 7, the forward most edge of which is rendered conductive by metallic coating or a metallic plate. The forward most edge electrically becomes a single plate of a capacitor and functionally becomes a sensor means at 7. The electrical circuit through the capacitor is completed when a contact, as at 20a, brushes against a switch 20b located within the handle 17. When the linkage arm 20 brushes against the switch, a circuit closes to operate the sensor for a brief interval before the cutting of the animal nail located within the apertures.

In the preferred embodiment the sensor means is a conductive plate, which forms a single plate of a capacitor. Earth ground, through the clipper user, or the pet, effectively provides the opposing plate and forms a complete capacitor. The capacitance of the capacitor is affected by the electrical characteristics of material interposed between the single plate and the earth ground. The capacitor is included in a circuit such that changes in the instantaneous capacitance of the capacitor cause a change in the oscillatory frequency of the circuit, as at 24a (see FIG. 12). The oscillatory frequency is interpreted by a digital processor, as at 24b (see FIG. 12), whose programming differentiates between frequencies arising from interposing air, nail, or nail with underlying quick. The programming causes, a quick indicator, preferably an appropriate pattern of light emitting diodes (LEDs), to switch on or off thus communicating the type of material being sensed to the user.

In the preferred embodiment, three LEDs are used, as at 8: green, yellow and red. If the red LED is lit, it indicates that quick is present near the sensor and by inference the clipping means is positioned such that it would cut through the quick. If the green LED is lit, it indicates that only nail material is present near the sensor and the clipper means and thus it is safe to cut. If the yellow LED is lit, between the red and the green LEDs, the clipper means is located between the quick and the nail. Other light patterns, such as no LEDs lit or all LEDs blinking, indicate operational situations such as low battery power or no material other than air in the vicinity of said sensor to the user. In an alternate embodiment, the quick indicator is sensible by the user of the cutter with the sound or vibration generated by a motor, beeper, tweeter, or horn located within the handle 17.

Figure 8:
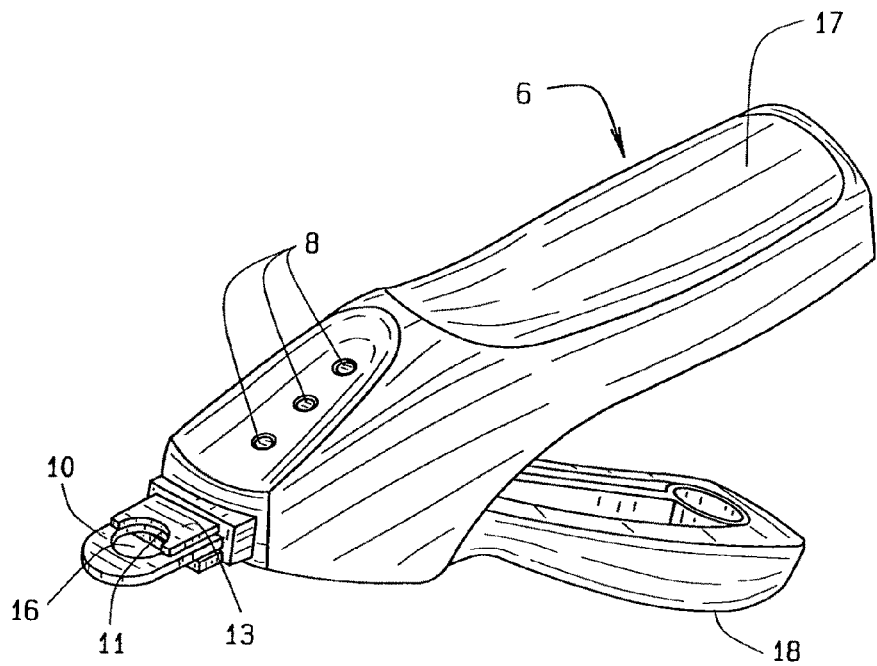
FIG. 8 is a perspective view showing the present invention.
Figure 9:
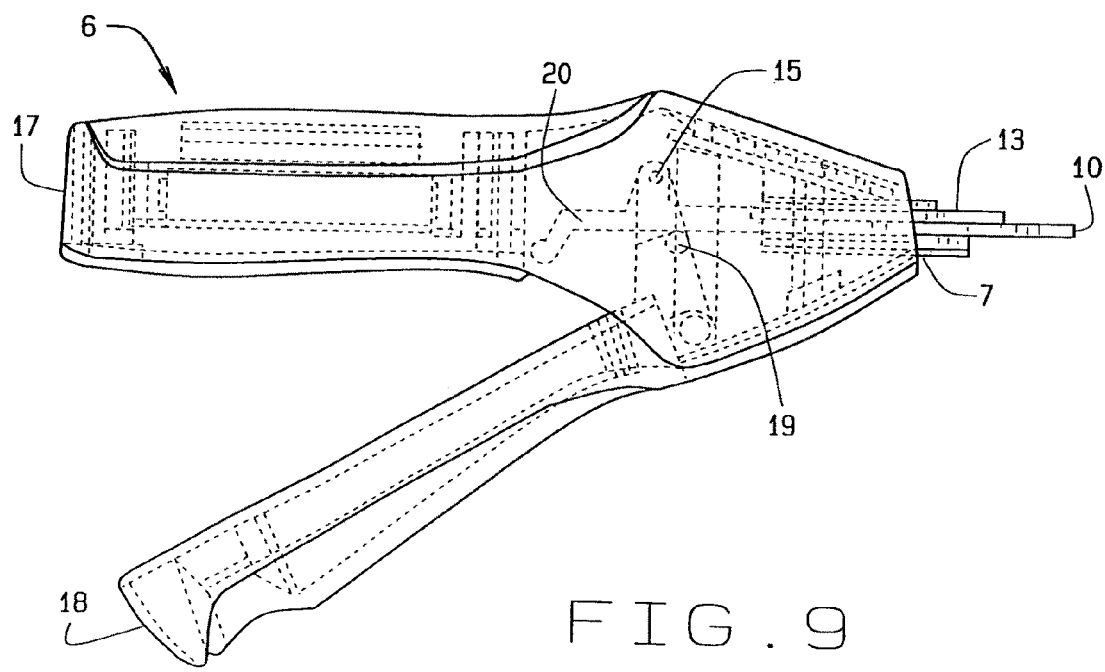
FIG. 9 is a side view showing the present invention.
Figure 10:
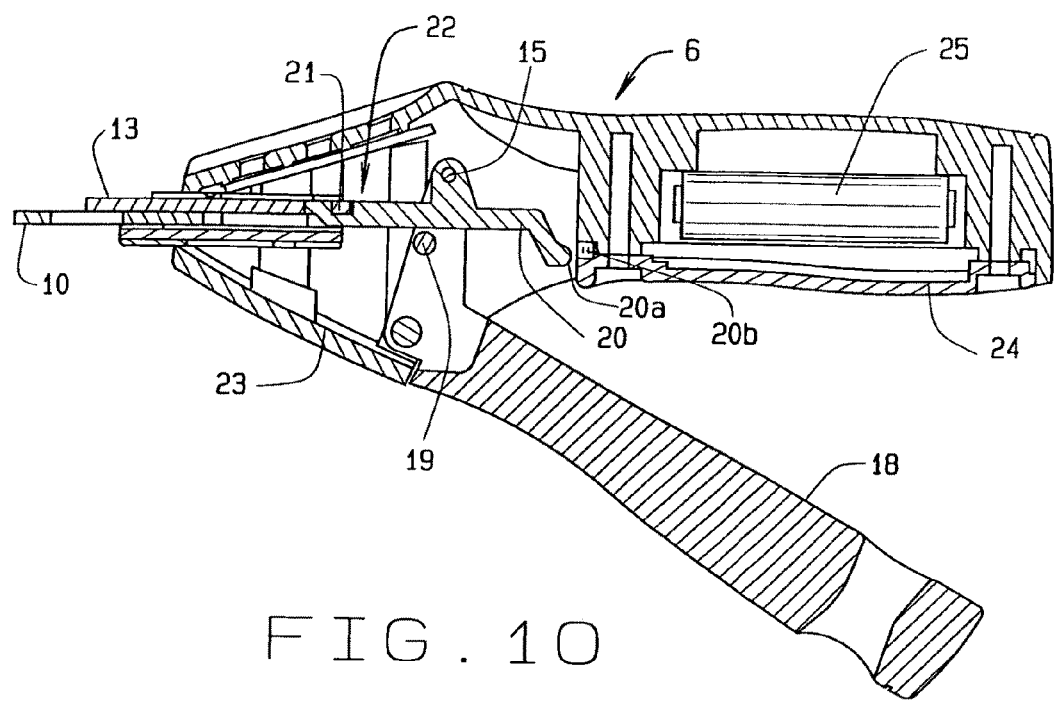
FIG. 10 shows an opposite side view in cross-section of a fragmentary portion of the present invention prior to movement of the cutting blade.
Figure 11:
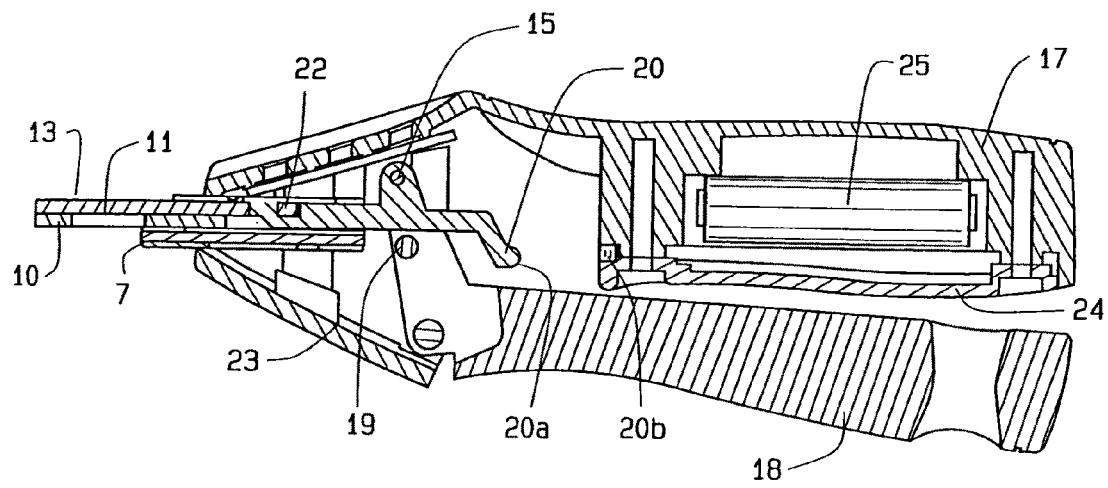
FIG. 11 shows the same view as FIG. 10 with the blade positioned in the cutting position.

The electric charge for the circuitry and the electrical component is provided through the battery 25. The circuitry is protected from a reversed battery polarity installation by a diode, as at 24c (see FIG. 12). Handles 17, 18 when squeezed together cause the blade 13 to move in a forward direction passing over (see FIG. 11) aperture 16 which receives the animal nail to be clipped. The animal nail is positioned also through aperture 11 which is in the mounting arm, or moving blade 13 and through one selected and pre-positioned aperture 16 disposed in the fixed blade 10. The handles 17 and 18, as shown in FIG. 8, are pivotally connected by a pin 19 as then shown in FIG. 9. Handle 18 is connected to blade 13 by linkage arm 20 and pin 15 in FIG. 10. FIG. 10 shows the present invention without electrical power supplied from the battery to the sensor circuit as the contact 20a is separated from the switch 20b. The spring 23 biases the handle 18 by a flange and linkage arm which provides for the spring tension against the action of the handle. The linkage arm 20 is connected to the blade 13 by pin 22 which is received in slot 21 in the blade 13. The blade 10 is affixed by screws to handle 17. In use, the initial forward motion of the handle 17 by the user retracts the linkage arm 20 that closes the switch 20b which delivers power to the sensor circuitry in the preferred embodiment. After recognizing the output from the sensor, the user closes the handle 18 in a grip upon the handle 17 to advance the blade 13 and cut the nail. In an alternate embodiment, the linkage arm 20 closes a switch, as at 20b, located proximate to the forward end of the battery compartment.

Figure 12:
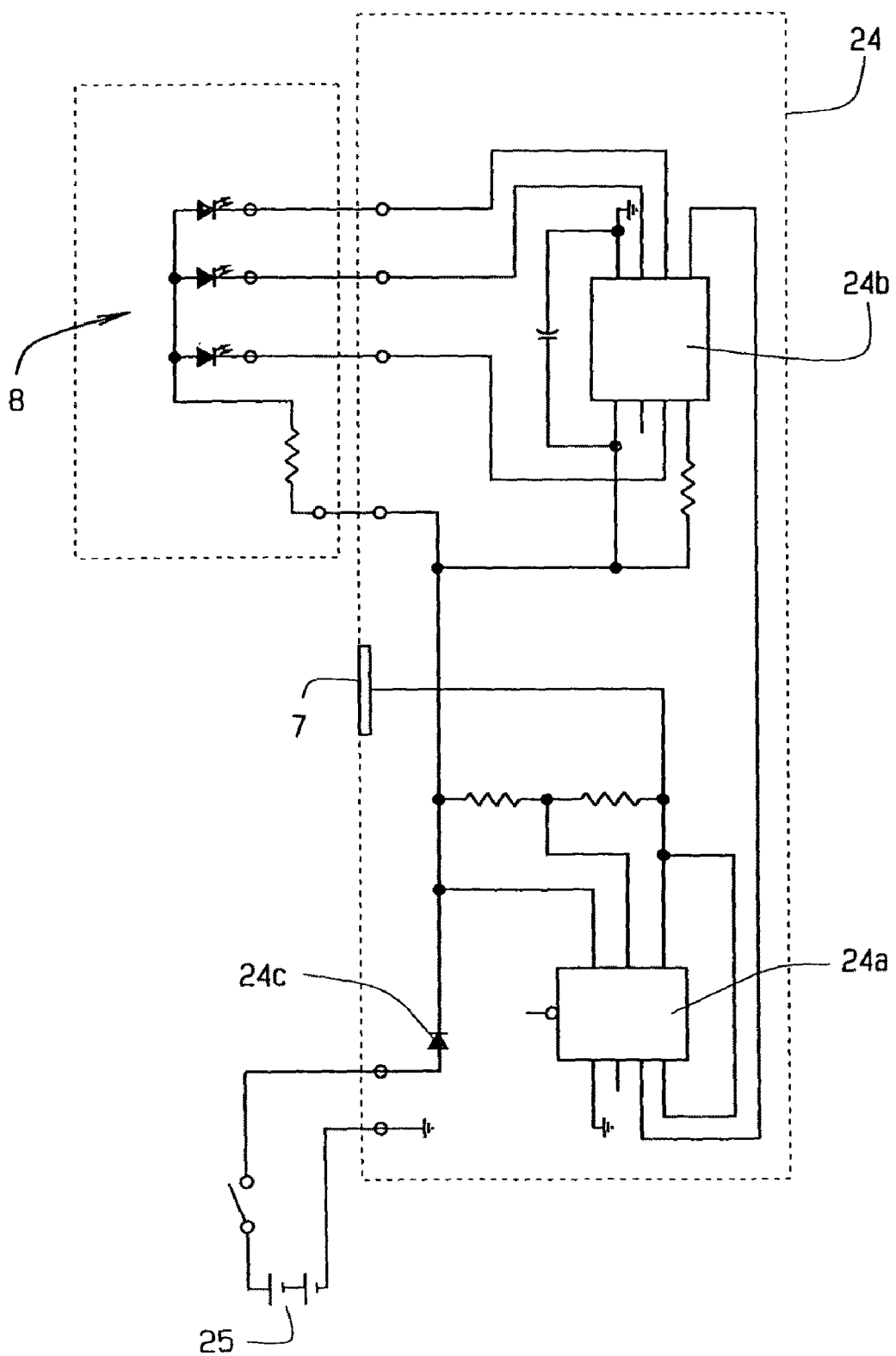
FIG. 12 shows the circuit diagram for the circuit used to detect the presence of a sensitive area of the nail.

FIG. 12 shows the circuit diagram for the circuit 24 used to detect the presence of a sensitive area of the nail. The detection circuit prevents too close of a cut when trimming an animal's nails. Furthermore, it includes a series of LEDs, as at 8, which are sequentially lit, to provide an indication as to when a nail is being cut too closely. Alternatively, the LEDs can be replaced with an audible or sensible signal generator.

Figure 13:
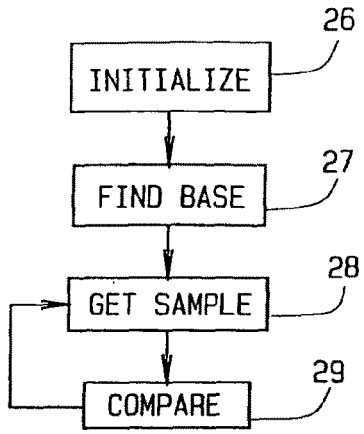
FIG. 13 is a block diagram of the circuitry for the sensor means.

FIG. 13 describes a block diagram of the master subroutines of the software program upon a digital processor, such as a microprocessor, 24b, (FIG. 12) for operating the sensor portion of the clipper. The block diagram of the high level flow includes four steps. First, the user turns on the clipper which initializes 26 the clipper and provides power to a processor, microprocessor, or microchip. The microprocessor has at least one counting routine and at least one looping routing. The counting routine is set to zero and the looping routine is set to a certain number upon initialization. Second, the program determines the baseline 27 number later used in a compare routine 29. Third, the sensing means takes samples 28 of the frequency provided by the capacitor circuit and sets the count. Fourth, the count is compared as at 29 to the baseline number and the sensing means activates the appropriate affirmative, warning, or stopping output, generally an LED or other sensible indicator, for viewing, or sensing, by the user. The program loops through the third and fourth steps as it continually samples the location of the clipper relative to the quick and also adjusts the LED.

Figure 14:
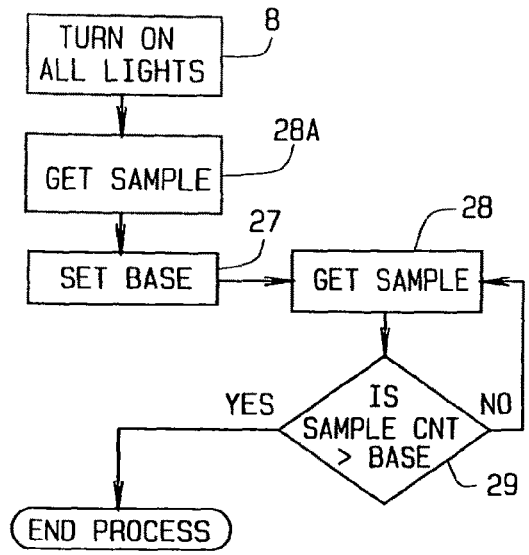
FIG. 14 is a block diagram of the sensor means circuitry when sampling and FIG. 14a is a further block diagram of the sensor means circuitry.

Then, FIG. 14 shows the logic for establishing the baseline 27 that the clipper uses for detecting the quick of the nail. Here in the second subroutine, the processor turns on the LEDs 8 and the software and sensing means takes a sample of the count given by air, as at 28A, that is not in the presence of a nail or the quick, and sets a baseline 27 number. The software then places the sensing means into a loop where the logic looks for a count greater, as at 29, than the baseline to check that the sensing means was not zeroed on the nail or the quick. When a higher count is found, the establishment of the baseline is completed and the second subroutine stops.

Figure 14A:
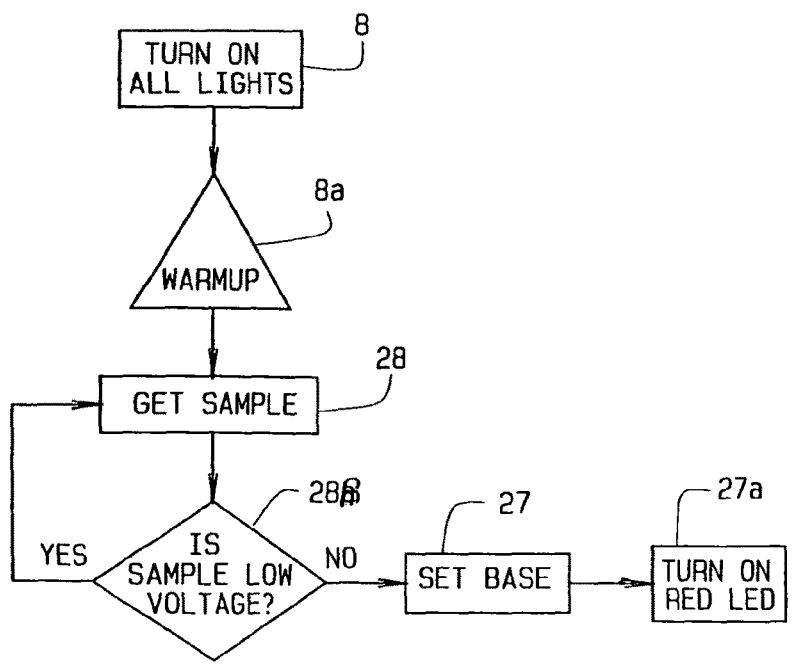

The sampling routine is further explained in FIG. 14a where as before the LEDs are initialized as at 8 and allowed to warm-up for a certain time, as at 8a. The software and sensing means takes a sample of the count given by air, as at 28, that is not in the presence of a nail or the quick. The sample is then checked for its voltage level, as at 28B. Samples that have a low voltage are released and another sample is taken and the voltage is measured again. When a sample is above the low voltage, the processor sets the baseline 27 number and illuminates the red LED.

Figure 15:
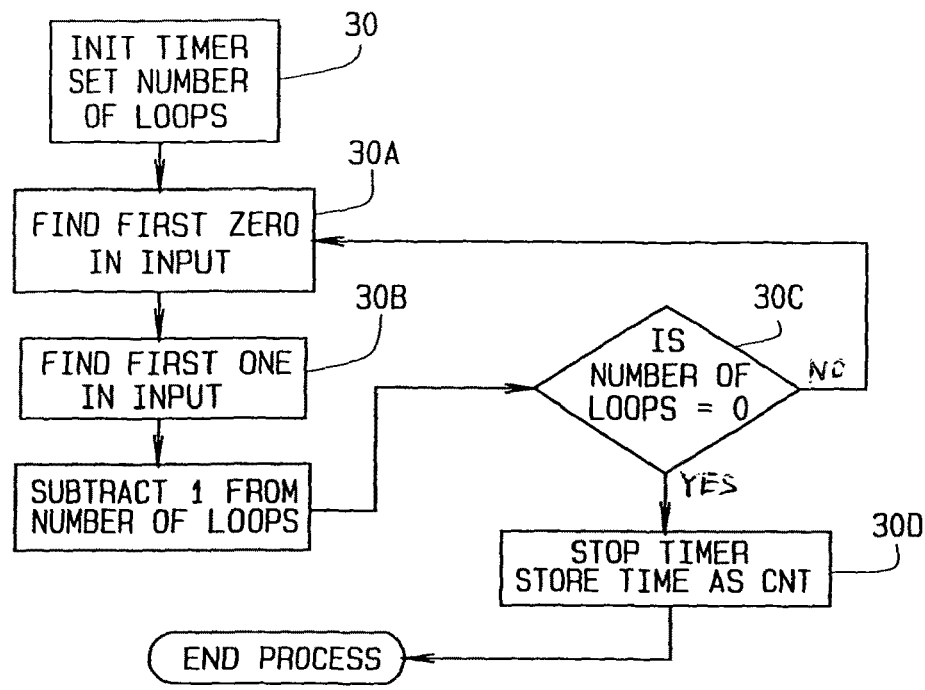
FIG. 15 is another block diagram of the timing for sampling for the sensor circuitry.

FIG. 15 shows the software moving from the baseline into the third subroutine for sampling. The software includes a timer circuit 30 that guides the sample routine. To begin sampling, the software sets the timer to zero and then starts the timer. The sensing means then detects a discharge of the capacitor 7 in the preferred embodiment by seeking the first "0", or zero as at 30a, from the circuit and then the first "1", or one, as at 30b. The detection process repeats for a predetermined number of frequency oscillations 30c in the capacitor. Upon reaching the predetermined number, the timer is stopped as at 30d and the count becomes the elapsed time.

Figure 16:
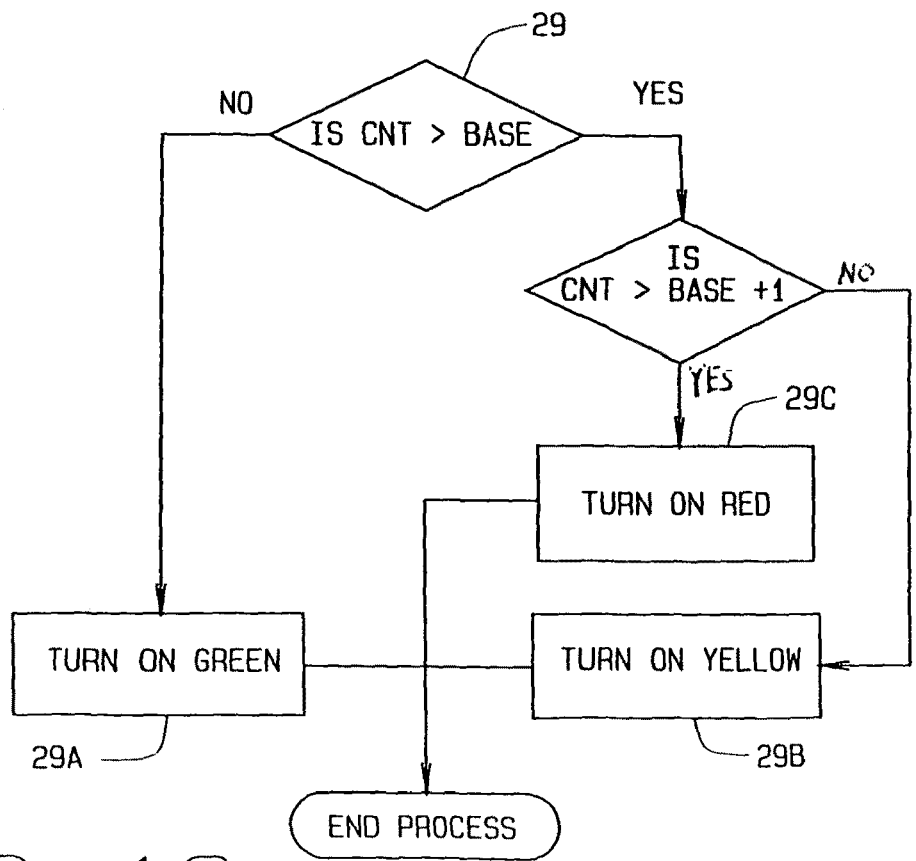
FIG. 16 is another block diagram of the sampling where the LEDs are activated to communicate position near the quick to the user.

Lastly, FIG. 16 describes the logic in the software for illuminating the LEDs. In this fourth subroutine, the software compares 29 the count detected in the third subroutine to the baseline 27 found by the second subroutine. For counts less than the baseline as at 29a, the software illuminates an affirmative output or green LED. If the count is the same as the baseline at 29b, the software intermittently illuminates a warning output or yellow LED. And if the count exceeds the baseline, the software illuminates the stopping output or red LED as at 29c. The LEDs are positioned upon the clipper so that they may be readily seen by the user as previously shown in FIG. 8.

Additionally, whenever power to the microchip or processor stops or is interrupted, the microchip resets itself. Upon restoration of power, the processing restarts from the beginning, including initializing and finding the baseline as previously described in FIG. 13.

Figure 17:
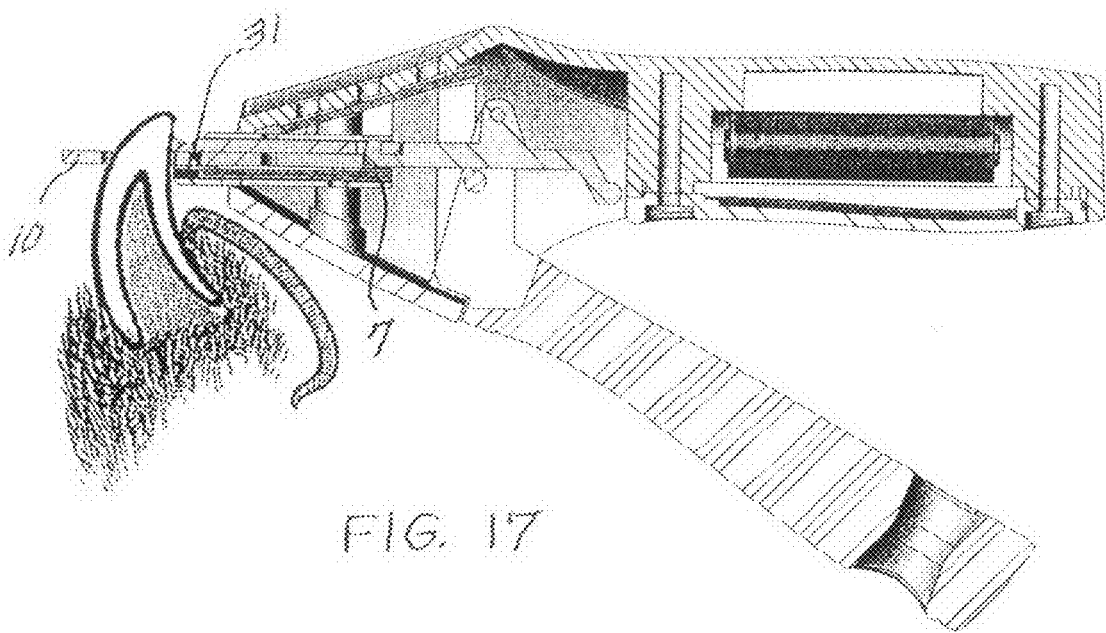
FIG. 17 discloses the arrangement of the movable cutting blade, the fix cutting blade, and the capacitance plate adjacent the fixed blade arranged for detecting the presence of quick in the positioned animal nail.

FIG. 17 shows the arrangement of the sensor means 7, the forwardmost edge 21 of which is the electrically charged single plate of a capacitor and which functions as the means for sensing the presents of quick within the animal nail. It is arranged adjacent the aperture 16 of the fixed blade 10. This single plate of the capacitor is generally mounted to the undersurface of the fixed blade 10; and, this sensor means 7, as previously explained, forms a circuit board for the various electrical operations of this animal nail clipper, and through grounding to earth, can detect the presence of just nail, or the animal quick, the latter of which indicates that the animal nail has been inserted too far through the aperture of the fixed blade 10. Initially the capacitance plate comes to a full charge in an amount of time determined by the factors that control the charged rate. The only dielectric (9-conductive medium) present is the air and the only ground for the capacitance single plate is the earth. The charging time becomes the base line for the charging of the capacitor.

Figure 18:
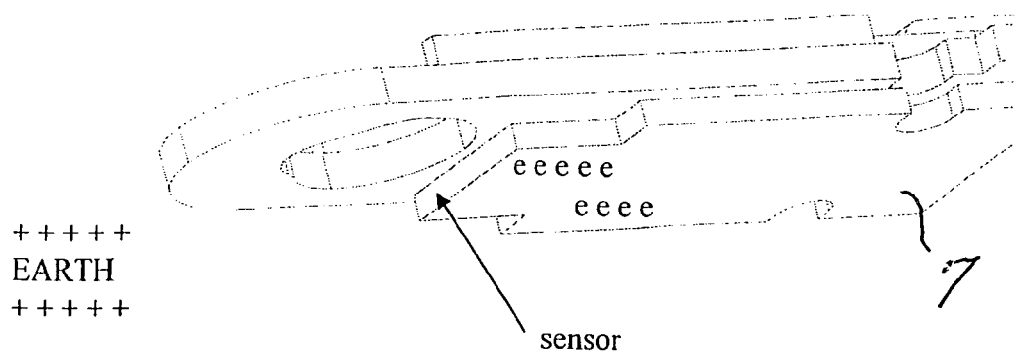
FIG. 18 provides a schematic view of the sensing means, and its arrangement adjacent the aperture of the fixed blade, and also showing how the capacitance plate is grounded to earth through the animal nail to furnish a detection of the presences of its nail quick.

FIG. 18 shows a schematic of the cutting blade, the fix plate, and the capacitor of the sensing means 7 in the structure of the blade configuration for this animal nail clipper.

Figure 19:
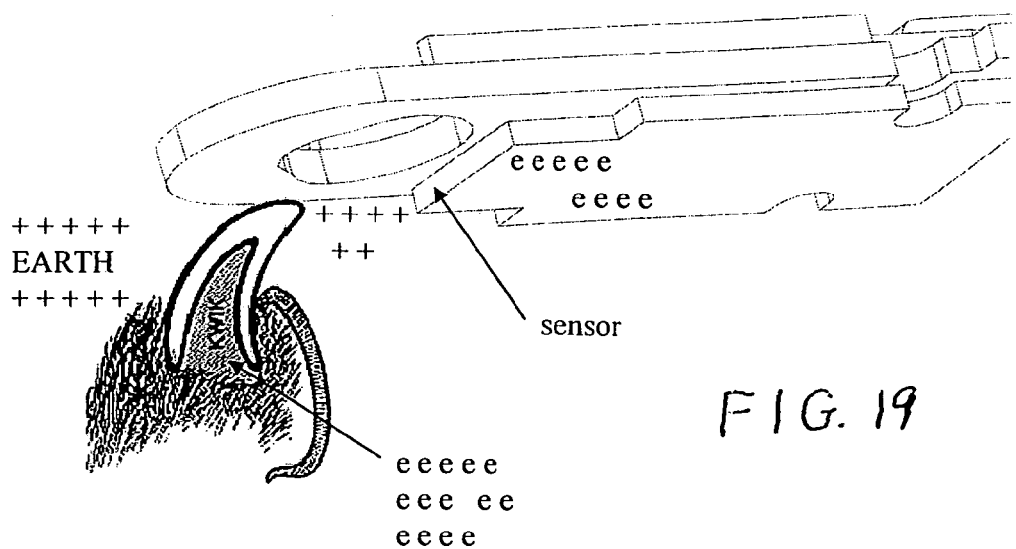
FIG. 19 shows a similar view to that of FIG. 18, with the animal nail being positioned for a cutting procedure.

FIG. 19 show the relationship of the various blades, and the capacitor for the sensor, at that time when the animal claw is placed in front of the sensor, the nail, which is largely non-conductive, with the nail acting as a dielectric filling the gap between the plate and the earth causing a change in the charging time. This change in charging rate is interrupted by the microprocessor as having a nail in front of the sensor. If the animal nail is positioned such that the quick of the claw is in front of the sensor, the charging rate is changed again, both by the action of the new dielectric characteristics of quick and the nail together, and because the quick is a conductor and suddenly takes over the job of being the second plate from the earth by conducting repelled electrons away. This resulting change in charging time is interrupted by the microprocessor as having nail with underlying quick in front of the sensor, which indicates whether a cut should be made, or not, the latter preventing the cutting of quick, in the nail, which would otherwise be a detriment of the treated animal.

The present invention has been shown and described herein in what is considered to be the most practical and preferred embodiment. It is recognized, however, that departures may be made there from within the scope of the invention and that obvious modifications will occur to a person skilled in the art.

Variations or modifications to the subject matter of this invention may occur to those skilled in the art of upon review of the development as explained herein. Such variations, if within the spirit of this development, are intended to be encompassing within the scope of any invention described herein. The description of the preferred embodiment, in addition to the illustration of this invention of the drawing, is done so for illustrative purposes only.

From the aforementioned description, an animal nail clipper has been described. The animal nail clipper is uniquely capable of readily indicating the proximity of a clipper to the quick in an animal's nail. The animal nail clipper and its various components may be manufactured from many materials including but not limited to steel, aluminum, polymers, high density polyethylene HDPE, polypropylene PP, polyethylene terephalate ethylene PETE, polyvinyl chloride PVC, nylon, ferrous and non-ferrous metals, their alloys and composites.

The invention claimed is:

1. A device for safely cutting a nail of an animal to a desired length, while reducing the possibility of injury to said animal by cutting into a quick of the nail, comprising:
    at least one cutting blade;
    a means for mounting said cutting blade, said mounting means having an accommodation for a sensing means;

mechanical actuating means for reciprocally moving said cutting blade from a first position to a second cutting position;

a fixed blade having an aperture for receiving the nail of the animal, said fixed blade being placed adjacent said cutting blade;

said mounting means having a hollow handle, said handle accommodating said cutting blade, said fixed blade and said actuating means;

said actuating means linking to said cutting blade, and having a moveable handle pivotally connecting with said hollow handle thus allowing a user to close said moveable handle upon said hollow handle thus advancing said cutting blade upon said fixed blade to cut a nail of an animal placed within said aperture;

a sensing portion capable of detecting the internal structure of the nail of the animal received in said aperture of said fixed blade and providing an indication thereof before actuation of said cutting blade, said sensing portion including said sensing means, an electrical supply located within said hollow handle, a digital processor, and a quick indicator connected together in circuitry;

said sensing means arranged adjacent to and connecting with the fixed blade and comprising a capacitor, said capacitor having at least a single plate, said capacitor of the sensing means being arranged at the approximate front end of the sensing means and just adjacent to the edge of the aperture of the fixed blade, said electrical supply providing power to said plate, said capacitor being in communication through said circuitry with said quick indicator, said capacitor including a circuit portion of said circuitry such that changes in the instantaneous capacitance of the capacitor causes a change in the oscillatory frequency of said circuit portion, said oscillatory frequency being interpreted by said digital processor, the digital processor being programmed to differentiate between frequency arising from the interposing of air, nail, or nail with underlying quick as located near the fixed blade aperture during usage; and said quick indicator comprising a visual display communicating with the circuitry for warning a user of said device to the presence of quick of the nail of an animal therein during usage, said visual display being at least one light emitting diode, for warning the user of said device to the presence of quick of the nail of the animal before any cutting occurs.

2. The device for safely cutting the nail of an animal of claim 1 wherein said digital processor comprises a microprocessor.

3. The device for safely cutting a nail of an animal as set forth in claim 2 wherein said circuitry is operable when the nail of an animal is received in said aperture to calculate the location of the cutting blade in relation to said quick and for activating said quick indicator for revealing the location of said cutting blade upon the nail in preparation for an animal nail cut.

4. The device for safely cutting a nail of an animal as set forth in claim 3, wherein said microprocessor initializes, determines a baseline of said sensing means in relation to the animal nail, obtains a sample from said sensing means, and compares said sample to said baseline, and upon certain results of said comparing activates said quick indicator.

5. The device for safely cutting a nail of an animal of claim 4, wherein said visual display includes three light emitting diodes, said diodes being in electrical communication through said circuitry with the microprocessor, the program of the microprocessor through detection from the capacitor indicating through the illumination of a first LED that quick is present near the sensor and that the cutting blade is positioned such that it would cut through the quick of the animal nail, through the illumination of a second LED that only nail material is present near the sensor, and that it is safe to make a nail cut, and through the illumination of a third LED that the cutting blade is located between the quick and the nail and that the cutting blade is approximating the location where a cut may be made.

6. The device for safely cutting the nail of an animal of claim 4 wherein said sensing means with its frontal located single plate of said capacitor is fixed to the underside of the fixed cutting blade, positioning the capacitor just adjacent an edge of the aperture through the fixed cutting blade, such that upon activation of the device, and energization of its capacitor, the capacitor grounds through the animal nail and to ground for detecting the presence of nail, a combination of nail and quick, or only the quick of the animal nail.

7. A nail structure sensor construction, for an animal nail clipper that has a fixed blade and a movable blade positioned adjacent to the fixed blade to be movable upon and across a face of the fixed blade between a first unactuated position and a second actuated position to effect a cutting of a portion of a nail of an animal, to reduce the possibility of cutting into the quick of the nail of the animal as the animal nail clipper is operated, wherein the fixed blade has an aperture therethrough into which the nail of the animal may be inserted such that a portion of such nail extends through and projects beyond the aperture, the cutting blade includes a leading edge positioned generally adjacent one side of the aperture through the fixed blade and any nail portion extending therethrough when the movable blade is in its first unactuated position to be movable across the aperture to effect cutting of a portion of the nail extending through the aperture of the fixed blade when the cutting blade is moved to its second actuated position, and the animal nail clipper includes a squeezable handle construction having first and second handle portions pivotally connectable to one another and operable to effect movement of the leading edge of the cutting blade upon and across the face of the fixed blade and the aperture therethrough as the handle construction is squeezed by a user, such action by the user effecting cutting of a portion of the nail of the animal projecting beyond the aperture, the nail structure sensor construction comprising electrical circuitry including a connection to an electrical power source for powering said electrical circuitry, a capacitive sensor, a digital processor, and an indicator;

said capacitive sensor including a plate member mounted near the leading edge of the cutting blade, the capacitance of such capacitive sensor being variably dependent upon the nail structure of the nail portion extending into the aperture of the fixed blade generally adjacent to the leading edge of the cutting blade;

said digital processor monitoring said variable capacitance and providing to said indicator information indicative of the nail structure of the nail of the animal generally adjacent to the leading edge of the cutting blade;

said indicator responsive to said information from said digital processor to communicate to a user indications of the nail structure of the nail of the animal generally adjacent to the leading edge of the cutting blade, a first of which indications indicates that the nail structure of the portion of the nail adjacent to the leading edge of the cutting blade is in the quick of the nail and a second of which indicates that the nail structure of the portion of the nail adjacent to the leading edge of the cutting blade is beyond the quick of the nail;

whereby a user may determine from said indications whether to squeeze the handles to effect a cutting of the portion of the nail projecting beyond the aperture of the fixed blade or to reposition the nail of the animal and the portion extending into and projecting beyond the aperture through the fixed blade before effecting a cutting action by squeezing the handles of the animal clipper.

8. The nail structure sensor construction of claim 7 wherein said digital processor is a microprocessor.

9. The nail structure sensor construction of claim 8 wherein said indicator includes visual indications indicative of the nail structure of the nail of the animal generally adjacent to the leading edge of the cutting blade.

10. The nail structure sensor construction of claim 9 wherein said indicator includes a plurality of differently colored lights the different colors of which are indicative of differences in the nail structure of the nail of the animal generally adjacent to the leading edge of the cutting blade.

11. The nail structure sensor construction of claim 8 wherein said plate of said capacitive sensor is mounted generally adjacent to the leading edge of the cutting blade when the cutting blade is at its first unactuated position.

12. The nail structure sensor construction of claim 11 wherein at least one of the handle portions of the animal clipper includes a hollow for holding
    a mechanical actuator operable in response to a squeezing of the handle portions by a user to actuate and move the leading edge of the cutting blade from its first unactuated position to its second actuated position,
    a battery for providing electrical power to said electrical circuitry, and
    said digital processor.

13. The nail structure sensor construction of claim 7 wherein said capacitive sensor is a component within a circuit portion whose frequency varies in accordance with the nail structure of the portion of the animal nail generally adjacent to the leading edge of the cutting blade.

14. The nail structure sensor construction of claim 13 wherein said digital processor monitors said variable frequencies of said circuit and is responsive to different of said variable frequencies to produce different information indicative of the nail structure of the nail of the animal generally adjacent to the leading edge of the cutting blade.

15. A method of cutting a nail of an animal, while reducing the possibility of cutting into the quick of the nail, with an animal nail clipper that has a fixed blade and a movable blade positioned adjacent to the fixed blade to be movable upon and across a face of the fixed blade between a first unactuated position and a second actuated position to effect a cutting of a portion of a nail of an animal, to reduce the possibility of cutting into the quick of the nail of the animal as the animal nail clipper is operated, wherein the fixed blade has an aperture therethrough into which the nail of the animal may be inserted such that a portion of such nail extends through and projects beyond the aperture, the cutting blade includes a leading edge positioned generally adjacent one side of the aperture through the fixed blade and any nail portion extending therethrough when the movable blade is in its first unactuated position to be movable across the aperture to effect cutting of a portion of the nail extending through the aperture of the fixed blade when the cutting blade is moved to its second actuated position, and the animal nail clipper includes a squeezable handle construction having first and second handle portions pivotally connectable to one another and operable to effect movement of the leading edge of the cutting blade upon and across the face of the fixed blade and the aperture therethrough as the handle construction is squeezed by a user, such action by the user effecting cutting of a portion of the nail of the animal projecting beyond the aperture, such method comprising
    providing a capacitive sensor including a plate member mounted near the leading edge of the cutting blade, the capacitance of such capacitive sensor being variably dependent upon the nail structure of the nail portion extending into the aperture of the fixed blade generally adjacent to the leading edge of the cutting blade, certain capacitive values being indicative that the nail structure of the portion of the nail adjacent to the leading edge of the cutting blade is in the quick of the nail and other capacitive values being indicative that the nail structure of the portion of the nail adjacent to the leading edge of the cutting blade is beyond the quick of the nail;
    inserting into and positioning a portion of the nail of the animal in the aperture in the fixed blade such that a portion of such nail projects beyond the aperture;
    monitoring said capacitance of said capacitive sensor to determine whether the nail portion near the leading edge of the cutting blade is a nail portion beyond the quick of the nail;
    if necessary, re-positioning the portion and amount of the nail inserted into the aperture in the fixed blade until it is determined that the nail portion near the leading edge of the cutting blade is a nail portion beyond the quick of the nail;
    squeezing the handle portions of the animal clipper to effect movement of the leading edge of the cutting blade across the aperture of the fixed blade to cut a portion of the nail projecting beyond the aperture.

16. The method of claim 15 wherein
    said capacitive sensor is included within electrical circuitry that also includes a connection to an electrical power source for powering said electrical circuitry, a digital processor, and an indicator;
    said digital processor monitors said variable capacitance and provides to said indicator information indicative of the nail structure of the nail of the animal generally adjacent to the leading edge of the cutting blade;
    said indicator is responsive to said information from said digital processor to provide indications of the nail structure of the nail of the animal generally adjacent to the leading edge of the cutting blade, a first of which indications indicates that the nail structure of the portion of the nail adjacent to the leading edge of the cutting blade is in the quick of the nail and a second of which indicates that the nail structure of the portion of the nail adjacent to the leading edge of the cutting blade is beyond the quick of the nail.

17. The method of claim 16 wherein said capacitive sensor is a component within a circuit portion whose frequency varies in accordance with the nail structure of the portion of the animal nail generally adjacent to the leading edge of the cutting blade.

18. The method of claim 17 wherein said digital processor monitors said variable frequencies of said circuit and is responsive to different of said variable frequencies to produce different information indicative of the nail structure of the nail of the animal generally adjacent to the leading edge of the cutting blade.

* * * * *